United States Patent
Ohta

(10) Patent No.: US 11,975,377 B2
(45) Date of Patent: May 7, 2024

(54) AMORPHOUS METAL THIN STRIP, LAMINATED CORE, AND AMORPHOUS METAL THIN RIBBON PUNCHING METHOD

(71) Applicant: Proterial, Ltd., Tokyo (JP)

(72) Inventor: Motoki Ohta, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 318 days.

(21) Appl. No.: 17/435,210

(22) PCT Filed: Feb. 13, 2020

(86) PCT No.: PCT/JP2020/005649
§ 371 (c)(1),
(2) Date: Aug. 31, 2021

(87) PCT Pub. No.: WO2020/179399
PCT Pub. Date: Sep. 10, 2020

(65) Prior Publication Data
US 2022/0134409 A1    May 5, 2022

(30) Foreign Application Priority Data
Mar. 1, 2019 (JP) .................................. 2019-037767

(51) Int. Cl.
*B21D 28/26* (2006.01)
*C22C 45/02* (2006.01)
(Continued)

(52) U.S. Cl.
CPC .............. *B21D 28/26* (2013.01); *C22C 45/02* (2013.01); *H01F 1/153* (2013.01); *H01F 41/02* (2013.01); *C22C 2202/02* (2013.01)

(58) Field of Classification Search
CPC ................................ B21D 28/26; C22C 45/02
See application file for complete search history.

(56) References Cited

U.S. PATENT DOCUMENTS

| 8,083,867 B2 | 12/2011 | Yoshizawa et al. |
| 8,414,712 B2 | 4/2013 | Yoshizawa et al. |

(Continued)

FOREIGN PATENT DOCUMENTS

| CN | 101351571 A | 1/2009 |
| CN | 101627141 A | 1/2010 |

(Continued)

OTHER PUBLICATIONS

English Translation of JPS629898A, obtained form EPO espacenet Sep. 9, 2023 (Year: 2023).*

(Continued)

*Primary Examiner* — Adam Krupicka
(74) *Attorney, Agent, or Firm* — Westman, Champlin & Koehler, P.A.

(57) ABSTRACT

A punching method with a favorable punchability with respect to amorphous metal thin ribbons, an amorphous metal thin strip produced by the method, and a laminated core, are provided. The amorphous metal thin strip has a thickness of from more than 30 μm to 50 μm, and a side configured by a punched surface on which at least a shear droop, a shearing surface, and a fractured surface are observed, the width of the shear droop relative to the thickness of the metal thin strip being 30% or less at the side.

9 Claims, 4 Drawing Sheets

(51) Int. Cl.
*H01F 1/153* (2006.01)
*H01F 41/02* (2006.01)

(56) References Cited

U.S. PATENT DOCUMENTS

| | | |
|---|---|---|
| 2002/0158540 A1 | 10/2002 | Lindquist et al. |
| 2009/0065100 A1 | 3/2009 | Yoshizawa et al. |
| 2010/0098576 A1 | 4/2010 | Yoshizawa et al. |
| 2010/0230010 A1 | 9/2010 | Yoshizawa et al. |
| 2018/0166213 A1 | 6/2018 | Makino et al. |
| 2019/0202175 A1 | 7/2019 | Nishikawa et al. |

FOREIGN PATENT DOCUMENTS

| | | |
|---|---|---|
| JP | S6158450 A | 3/1986 |
| JP | S629898 A | 1/1987 |
| JP | H04147725 A | 5/1992 |
| JP | 2008-213410 A | 9/2008 |
| JP | 2009263775 A | 11/2009 |
| JP | 2013185162 A | 9/2013 |
| WO | 2018-155206 A1 | 2/2019 |
| WO | 2019208651 A1 | 10/2019 |

OTHER PUBLICATIONS

Extended European Search Report, for European Patent Application No. 20766974.8, dated Oct. 28, 2022, 8 pages.
Japanese Notice of Reasons for Refusal, for Japanese Patent Application No. 2021-503504, dated Oct. 4, 2022, 6 pages.
Second Notice of Reasons for Refusal for Chinese Patent Application No. 202080017567.3, dated Mar. 7, 2023, 17 pages.
Office Action, including search report, for Chinese Patent Application No. 202080017567.3, dated Nov. 18, 2022, 14 pages.
International Search Report and Written Opinion for International Application No. PCT/JP2020/005649, dated May 12, 2020, 10 pages.

* cited by examiner

2

AMORPHOUS METAL THIN STRIP, LAMINATED CORE, AND AMORPHOUS METAL THIN RIBBON PUNCHING METHOD

CROSS-REFERENCE TO RELATED APPLICATION

This Application is a Section 371 National Stage Application of International Application No. PCT/JP2020/005649, filed 13 Feb. 2020, and published as WO 2020/179399 A1, on 10 Sep. 2020, in Japanese, the contents of which are hereby incorporated by reference in their entirety.

TECHNICAL FIELD

The present invention relates to an amorphous metal thin strip used as a laminated core for motors, antennas, and the like, a laminated core, and an amorphous metal thin ribbon punching method.

BACKGROUND ART

Globally, power consumption by motors is said to be about half of total power consumption. Power losses in a motor can be roughly divided into magnetic core loss, copper loss, and mechanical loss in the motor core. When focusing only on magnetic core loss, favorable soft magnetic properties are required of the material.

Currently, the main soft magnetic materials used in motor cores are non-oriented electromagnetic steel sheets. However, in recent years, amorphous metal thin ribbons, which have much more favorable soft magnetic properties than non-oriented electromagnetic steel sheets, have been attracting attention, and have begun to be put into practical use in limited applications. It is obvious that expansion of the applicable range of amorphous metal thin ribbons will help to reduce global power consumption, and it is expected that amorphous metal thin ribbons will be widely utilized. For a motor core, a laminated core in which a non-oriented electromagnetic steel sheet or an amorphous metal thin ribbon is processed into a predetermined shape and layered, is used. There are many processing methods, and examples of methods for obtaining motor cores with a complex shape include a punching process that can be performed in a shape corresponding to the complex shape and that requires a short processing time.

Amorphous metal thin ribbons of 30 µm or less are generally used. Such thicknesses are from about ⅕ to 1/20 of the thickness of non-oriented electromagnetic steel sheets. In other words, when cores are manufactured with amorphous metal thin ribbons, the number of layers increases, which in turn increases the number of punching processes.

For example, Japanese Patent Application Laid-Open (JP-A) No. 2008-213410 and WO 2018/155206 disclose layering of amorphous metal thin ribbons and punching the laminated body. In both of these known documents, the number of punching operations is reduced because punching is done after layering.

JP-A No. 2008-213410 discloses that a laminated plate is prepared in which a plurality of soft magnetic metal thin ribbons, each with a thickness of from 8 to 35 µm, are disposed one on another in layers, a laminated plate in which the thickness of each layer of thermosetting resin between the metal thin ribbons is from 0.5 µm to 2.5 µm, and the total thickness of the laminated plate is from 50 µm to 250 µm, is obtained, and then the laminated plate is punched.

WO 2018/155206 discloses a method for manufacturing a laminated member, the method including: a fixing process of partially fixing a portion of the interlayers of stacked amorphous metal thin ribbons to each other; and a punching step of punching a laminated member by cutting a group of the layered amorphous metal ribbons at portions other than the fixed part that has been fixed. The document describes that the thickness of the amorphous metal thin ribbon is from 10 to 60 µm.

PRIOR ART DOCUMENTS

Patent Documents

Patent Document 1: JP-A No. 2008-213410
Patent Document 2: WO 2018/155206

SUMMARY OF INVENTION

Technical Problem

However, large-scale mass production of amorphous metal thin ribbons applied to motor cores has not yet been achieved. One of the reasons for this is that an amorphous metal thin ribbon has a high hardness. The Vickers hardness of an amorphous metal thin ribbon of, for example, an Fe-based alloy composition is from about 700 HV to 950 HV. Such values are outstandingly high among Fe-based alloys. This makes it difficult to perform machining.

One method of processing amorphous metal thin ribbons is shear cutting, in which an object to be processed is sheared with a blade or a similar tool. Amorphous metal thin ribbons can be processed relatively easily by shear cutting. However, processing by shear cutting is only applicable to relatively simple shapes, and is especially difficult to apply to complex shapes such as motor cores.

For this reason, the application of a punching process requires further consideration in relation to the production of motor cores. However, when repeatedly punching amorphous metal thin ribbons, the wear on a punching die is severe due to the high hardness. When using a single die and punching amorphous metal thin ribbons one by one, the number of times the die can be used in succession for punching is at most from 10,000 to 20,000 times. When punching a plurality of amorphous metal thin ribbons disposed one on another in layers, the number of times a die can be used in succession will be further reduced.

When the durability of a die is of such a level, the share of the die cost in the manufacturing cost of motor cores obtained by layering punched amorphous metal thin strips is high, and is incommensurate with the cost of motor cores demanded by the market. In order to apply amorphous metal thin ribbons to motor cores, some means of improving the punchability needs to be realized.

In other words, an object of the present disclosure is to provide a punching method with favorable punchability with respect to amorphous metal thin ribbons, an amorphous metal thin strip produced by the method, and a laminated core.

Solution to Problem

The means to solve a problem includes the following aspects.

<1> An amorphous metal thin strip, including;
a side configured by a punched surface on which at least a shear droop, a shearing surface, and a fractured surface are observed, wherein:
the metal thin strip has a thickness of from more than 30 μm to 50 μm, and
at a side, a width of the shear droop relative to the thickness of the metal thin strip is 30% or less.
<2> The amorphous metal thin strip according to <1>, wherein the width of the shear droop is 8 μm or less.
<3> The amorphous metal thin strip according to <1> or <2>, having an alloy composition represented by the following formula: $Fe_{100-a-b-c-d}B_aSi_bC_cM_d$, wherein in the formula, M is at least one of Al, Sn, Cr, Mn, Ni, or Cu, and a, b, c, and d satisfy 7≤a≤20, 1≤b≤19, 0≤c≤4, and 0≤d≤2 in atomic %.
<4> The amorphous metal thin strip according to <3>, satisfying the relationship: 0.03≤d≤2.
<5> A laminated core in which a plurality of the amorphous metal thin strips according to any one of <1> to <4> are disposed one on another in layers.
<6> An amorphous metal thin ribbon punching method, comprising:
preparing an amorphous metal thin ribbon with a thickness of from more than 30 μm to 50 μm;
punching the amorphous metal thin ribbon; and
forming a side of the amorphous metal thin ribbon configured by a punched surface on which at least a shear droop, a shearing surface, and a fractured surface are observed, a width of the shear droop relative to the thickness of the metal thin strip is 30% or less.
<7> The amorphous metal thin ribbon punching method according to <6>, wherein
the amorphous metal thin ribbon having an alloy composition represented by the following formula: $Fe_{100-a-b-c-d}B_aSi_bC_cM_d$,
wherein in the formula, M is at least one of Al, Sn, Cr, Mn, Ni, or Cu, and a, b, c, and d satisfy 7≤a≤20, 1≤b≤19, 0≤c≤4, and 0≤d≤2 in atomic %.
<8> The amorphous metal thin ribbon punching method according to <7>, wherein in the formula, 0.03≤d≤2.
<9> The amorphous metal thin ribbon punching method according to any one of <6> to <8>, further comprising using a punching die configured by a punch and a die.

Advantageous Effects of Invention

According to the disclosure, a punching method that can improve the punchability of an amorphous metal thin ribbon can be provided. This enables production of an amorphous metal thin strip that is punched and has a low manufacturing cost. By using such an amorphous metal thin strip to produce a laminated core, application of amorphous metal thin ribbons to motor cores can be promoted.

DESCRIPTION OF EMBODIMENTS

Figure 1:
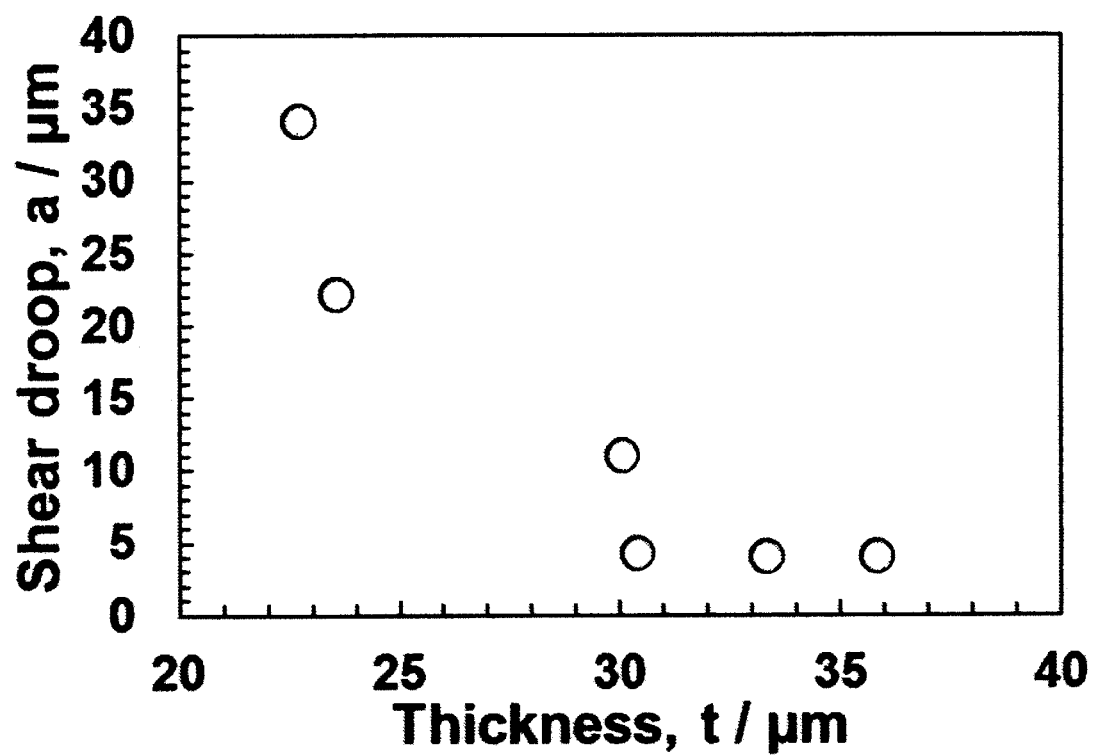
FIG. 1 is a diagram illustrating a relationship between the thickness and a shear droop of an amorphous metal thin strip.

Hereinafter, the invention will be described specifically by way of embodiments, but the invention is not limited by these embodiments.

The thickness of amorphous metal thin ribbons and the ease of punching process have not been sufficiently studied in the past. For example, a punching process is described in the above-described JP-A No. 2008-213410 and WO 2018/155206, while the above-described JP-A No. 2008-213410 illustrates an amorphous metal thin ribbon having a thickness of from 8 to 35 μm that can be used, and WO 2018/155206 illustrates an amorphous metal thin ribbon having a thickness of from 10 to 60 μm. Furthermore, specifically, in Examples of JP-A No. 2008-213410, an amorphous metal thin ribbon having a thickness of about 25 μm, an amorphous metal thin ribbon having a thickness of about 12 μm, and an amorphous metal thin ribbon having a thickness of about 18 μm are used, and WO 2018/155206 describes a plate thickness of 25 μm in the section of Background Art.

The inventor has found that a punching process can be easily performed by setting the thickness of an amorphous metal thin ribbon to a predetermined range.

In other words, one embodiment of the disclosure is an amorphous metal thin ribbon punching method in which the amorphous metal thin ribbon having a thickness of from more than 30 μm to 50 μm is used. This can improve the punchability of an amorphous metal thin ribbon.

According to the disclosure, in a punching process, a punching die composed of a punch and a die can be used. In such a case, the punch may be a punching die on the movable side and the die may be a punching die on the fixed side, and the die may be a movable punching die. According to the disclosure, a favorable punched surface can be obtained even when the clearance between the punch and the die is wide. According to the disclosure, drag against bending moment of an amorphous metal thin ribbon can be increased, and therefore a draft of the amorphous metal thin ribbon can be suppressed, making it easier for a punch or a punching blade to enter, and punching can be done with less deformation (shear droop).

An amorphous metal thin strip of another embodiment of the present disclosure obtained by the above-described processing method is an amorphous metal thin strip, wherein the metal thin strip has a thickness of more than 30 μm to 50 μm, and the metal thin strip includes a side composed of a punched surface on which at least a shear droop, a shearing surface, and a fractured surface are observed, and the width of the shear droop relative to the thickness of the metal thin strip is 30% or less on the side.

The thickness of the amorphous metal thin ribbon is equal to the thickness of the amorphous metal thin strip obtained by punching the amorphous metal thin ribbon.

As described above, in an embodiment of the disclosure, the width of a shear droop in a punched surface of an amorphous metal thin strip can be narrowed. Preferably, the width of a shear droop is 8 μm or less, and more preferably 7 μm or less, still more preferably 6 μm or less, and still more preferably less than 6 μm.

Hereinafter, an embodiment of the disclosure will be described in more detail. However, the scope of the invention is not limited to the embodiment.

<Amorphous Metal Thin Ribbon>

In an embodiment of the disclosure, an amorphous metal thin ribbon is used.

For the amorphous metal thin ribbon, an amorphous metal material such as an Fe-based material or a Co-based material can be used. Examples of such an amorphous metal material include a metal material that can be nanocrystallized. Such amorphous metal materials are soft magnetic metal materials.

Here, examples of Fe-based amorphous metal materials include a Fe-semimetal-based amorphous metal material such as a Fe—Si—B-based material, a Fe—B-based material, or a Fe—P—C-based material, and a Fe-transition metal-based amorphous metal material such as a Fe—Zr-based material, a Fe—Hf-based material, or a Fe—Ti-based material, and examples of Co-based amorphous metal materials include an amorphous metal material such as a Co—Si—B-based material or a Co—B-based material.

Examples of the metal material that can be nanocrystallized include a Fe—Si—B—Cu—Nb-based material, a Fe—B—Cu—Nb-based material, a Fe—Zr—B—(Cu) based material, a Fe—Zr—Nb—B—(Cu) based material, a Fe—Zr—P—(Cu) based material, a Fe—Zr—Nb—P—(Cu) based material, a Fe—Ta—C based material, a Fe—Al—Si—Nb—B based material, a Fe—Al—Si—Ni—Nb—B based material, a Fe—Al—Nb—B based material, and a Co—Ta—C based material.

The amorphous metal thin ribbon particularly preferably has an alloy composition that is represented by Formula: $Fe_{100-a-b-c-d}B_aSi_bC_cM_d$, where M is at least one element of Al, Sn, Cr, Mn, Ni, or Cu, and in which a, b, c, and d satisfy $7 \leq a \leq 20$, $1 \leq b \leq 19$, $0 \leq c \leq 4$, and $0 \leq d \leq 2$ in atomic %. Further preferably, $75 \leq 100-a-b-c-d$.

The alloy composition represented by the above-described Formula is allowed to contain unavoidable impurities. The unavoidable impurities are optional components, and for example, unavoidable impurities such as S and P are allowed to be replaced with Fe in the range of 1 atomic % or less.

The alloy composition represented by the above-described Formula will be described in more detail.

Si and B are both amorphous-forming elements. When the Si content is 1 atomic % or more, amorphous can be formed stably by quenching. At least part of Si is solid-soluble in α-Fe by heat treatment and forms a silicide such as $Fe_3Si$. When Si is more than 19 atomic %, the saturation magnetic flux density Bs decreases.

It is known that Si in α-Fe crystal grains of bcc structure affects the induced magnetic anisotropy of Fe-based metal magnetic materials, and when Si is 3.5 atomic % or more, the B—H curve can be sloped by heat treatment in a magnetic field to improve the linearity and an effect of adjusting the magnetic permeability is obtained, which is preferable.

When the content of B, which is an amorphous-forming element, is 7 atomic % or more, amorphous can be formed stably by quenching, and when the content is over 20 atomic %, the saturation magnetic flux density Bs decreases. Therefore, the content of B is preferably from 7 atomic % to 20 atomic %.

C is an optional component, and does not need to be contained. C has an effect of improving the wettability between a molten metal and the surface of a cooling roll, and in order to obtain this effect, the content is preferably 0.2 atomic % or more, and depending on the thickness of a thin ribbon to be fabricated, the content is preferably 4 atomic % or less.

The M element (at least one element of Al, Sn, Cr, Mn, Ni, or Cu) is an optional component, and does not need to be contained, and can be contained in the range of 2 atomic % or less. In particular, an amorphous metal thin ribbon to which at least one element of Al, Sn, or Ni is added in a range of more than 0 atomic % to 2 atomic % can narrow the width of the shear droop described below, contributing to improvement of the life of a mold.

For the amorphous metal thin ribbon to be punched, one that has undergone surface crystallization can be used. In this amorphous metal thin ribbon, the homogeneity of the surface hardness is increased, and under more even pressure, shear deformation is more likely to occur at lower pressure, starting from cracks, and therefore occurrence of excessive plastic deformation can be greatly suppressed, and the width of a shear droop can be reduced as described below.

By adding the above-described M element, an amorphous metal thin ribbon with surface crystallization can be obtained. The above-described effect can be easily obtained when the amount of M element added is 0.03 atomic % or more. The lower limit of the amount of M element added is more preferably 0.05 atomic %, and still more preferably 0.1 atomic %.

The amorphous metal thin ribbon in the embodiment is preferably produced with a thickness of more than 30 μm to 50 μm by a roll quenching method such as a single roll method or a twin roll method, in which raw materials that have been weighed to achieve a predetermined composition are melted by high-frequency induction melting or the like, then discharged via a nozzle onto the surface of a cooling roll rotating at high speed and quenched and solidified. When the thickness is greater than 30 μm, the punchability of an amorphous metal thin ribbon can be improved, as described above. The thickness is more preferably 30.3 μm or more, still more preferably 30.5 μm or more, still more preferably 31.0 μm or more, still more preferably 32.0 μm or more, and still more preferably 33.0 μm or more.

On the other hand, an amorphous metal thin ribbon with a thickness of more than 50 μm is prone to degradation of soft magnetic properties, such as magnetic coercive force, because the cooling rate inside the ribbon slows down in the roll quenching method and crystallization tends to occur inside the thin ribbon. Since the entire ribbon tends to be embrittled by crystallization, chipping or cracking tends to occur during a punching process, resulting in deterioration of processing precision. An amorphous metal thin ribbon is continuously cast in rolls and then wound once for transport, and an amorphous metal thin ribbon with a thickness of more than 50 μm tends to break during winding or unwinding, making it difficult to be applied to mass production. The thickness is preferably less than 40 μm, more preferably 39 μm or less, and still more preferably 38 μm or less. When used in cores for high frequency applications such as 20 kHz or higher, the thickness is particularly preferably less than 40 μm from the viewpoint of soft magnetic properties (vortex loss).

<Punching Process>

Figure 2:
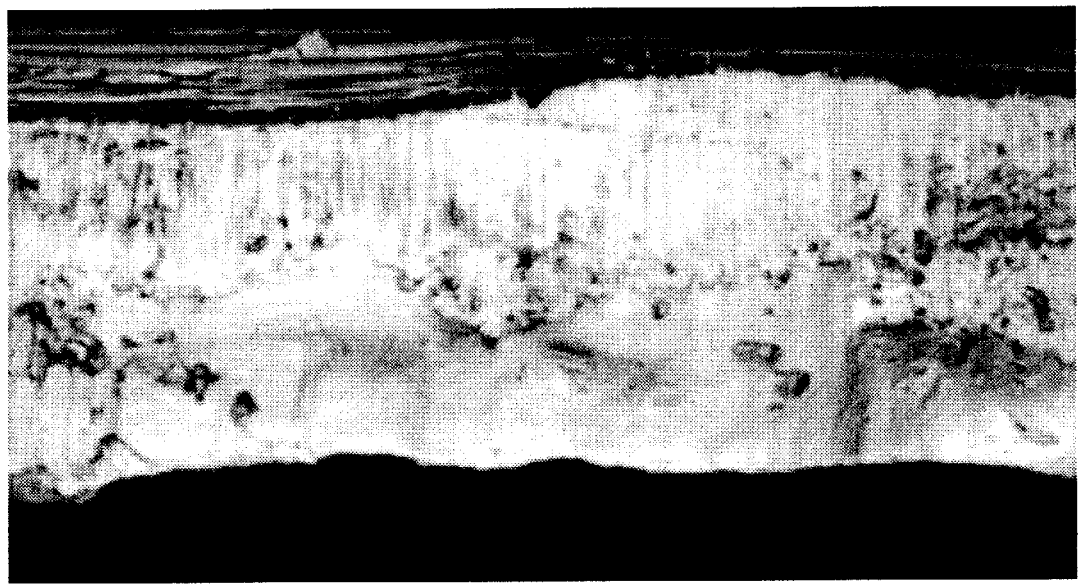
FIG. 2 is a photograph of a punched surface of an amorphous metal thin strip by a punching process.
Figure 3:
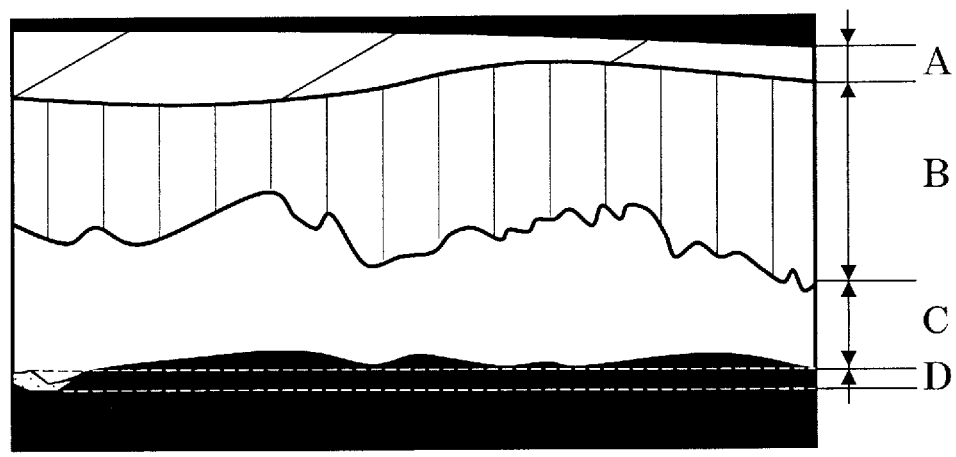
FIG. 3 is a schematic diagram of FIG. 2.
Figure 4:
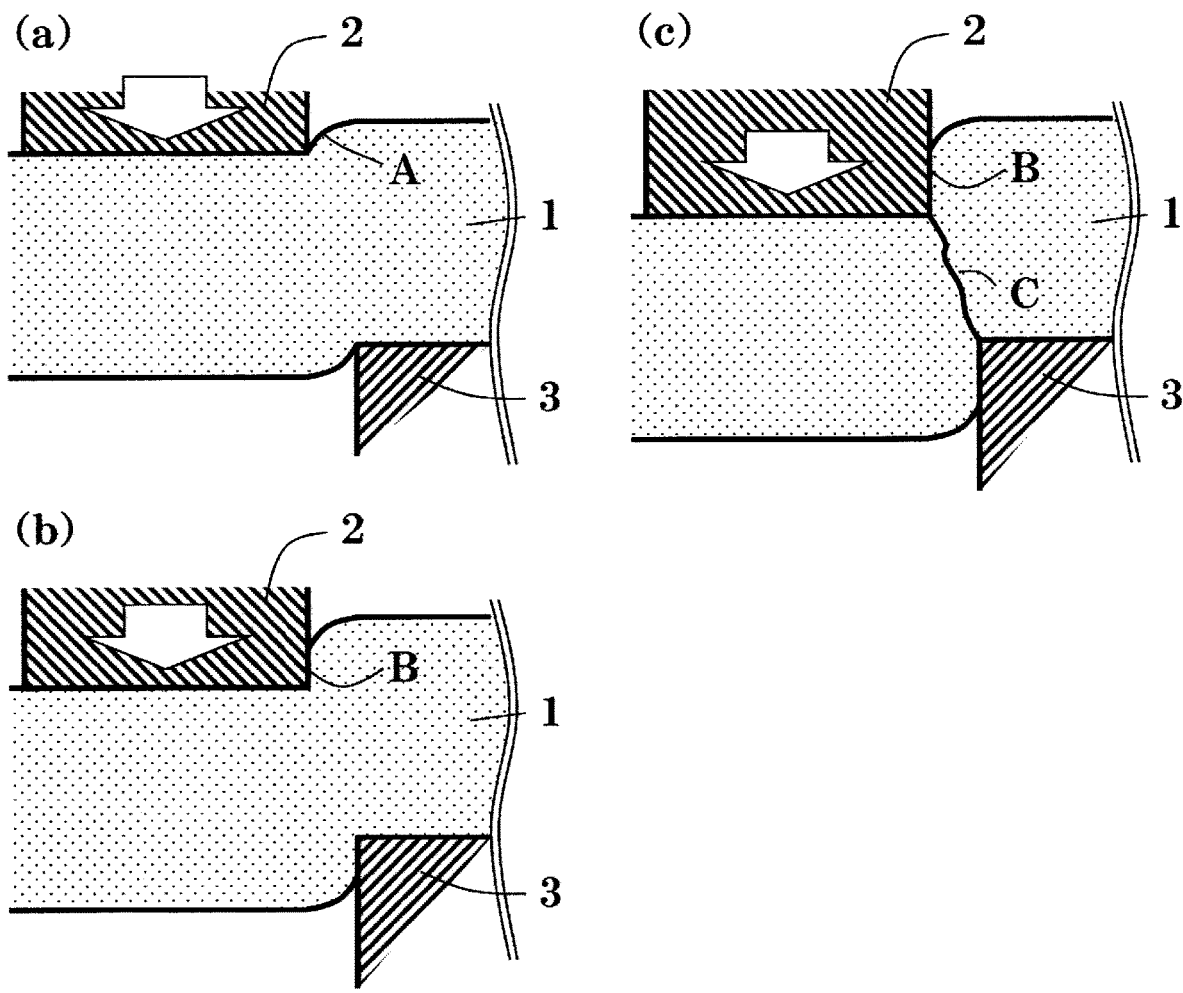
FIG. 4 is a schematic diagram for illustrating formation of a punched surface of a thin ribbon.

The process of forming the punched surface of an amorphous metal thin strip in the punching process of the embodiment is described using FIGS. 2 to 4.

FIG. 2 is a photograph of a punched surface of an amorphous metal thin strip. FIG. 3 is a schematic diagram of FIG. 2. Generally speaking, a shear droop A (slanting line portion), a shearing surface B (vertical line portion), a fractured surface C (white portion), and a burr D (gray portion) are formed on the punched surface by a punching process.

FIG. 4 is a schematic diagram to describe formation of a punched surface of an amorphous metal thin strip in a punching process. In the figure, 1 indicates an amorphous metal thin ribbon, 2 indicates a punching die (punch) on the movable side, and 3 indicates a punching die (die) on the fixed side. As illustrated in FIG. 4(*a*), when the punch 2 is pushed into the surface of the amorphous metal thin ribbon 1 placed on the die 3, the amorphous metal thin ribbon 1 is first deformed in such a manner that the surface is bent elastically, and a shear droop A is formed. As illustrated in FIG. 4(*b*), when the punch 2 is further pushed in, the amorphous metal thin ribbon 1 is sheared, and the shearing surface B is formed. As illustrated in FIG. 4(*c*), when the punch 2 is further pushed in, fracture occurs in such a manner that edges of the punch 2 and the die 3 of the amorphous metal thin ribbon 1 are connected, and a fractured surface C is formed. In this case, the amorphous metal thin ribbon 1 near the edges of the punch 2 and the die 3 remains slightly on the edge sides of the punch 2 and the die 3, and burrs (not illustrated) are formed. Burrs are formed when the shearing surface occupies the entire punched surface, and the atomic level movement occurs over a wide area, and the atoms that have lost their destination are formed as burrs.

Since the amorphous metal thin ribbon 1 has a high Vickers hardness and is considerably thin, the displacement during elastic deformation is large. As a result, a contact portion between the amorphous metal thin ribbon 1 and the edge of the punch 2 or the die 3 tends to be displaced, and cutting (shearing) at a predetermined position becomes difficult. As a result, stress concentration on the amorphous metal thin ribbon 1 by the punch 2 and the die 3 does not occur easily, and an initial fracture such as tearing occurs. In this case, a starting point of a fracture is not necessarily a place where the maximum stress is applied, but is considered to be a place where the mechanical strength is relatively weak, or a place where the hardness is locally low.

For example, when the Vickers hardness of a 25 μm Fe-based amorphous metal thin ribbon was measured, it was confirmed that there was a variation of from 750 to 900 HV, and furthermore, even within the same ribbon, the Vickers hardness had a standard deviation of about ±30 HV depending on the location. In other words, assuming a virtual line along an edge of the punch 2 or the die 3 on an Fe-based amorphous metal thin ribbon, without a large distribution in Vickers hardness, the maximum stress would be applied on the virtual line, and the ribbon is supposed to be deformed or fractured to the same extent on the virtual line. However, even on the virtual line of the amorphous metal thin ribbon, fracture occurs from the place where the hardness is locally low, and the surrounding area is deformed in such a manner as to be pulled, resulting in a shear droop.

When a shear droop is formed, excessive stress is applied to the punch 2 or the die 3, resulting in severe wear and tear of a die. This means that the life of the die is shortened, and the manufacturing cost of a motor core is increased. The fact that the width of a shear droop is narrow on the punched surface of an amorphous metal thin strip suggests that the life of a die can be improved. Therefore, in the embodiment, the width of a shear droop was measured as an index. After transition from a shear droop to a shearing, a stress applied to the punch 2 or the die 3 is reduced compared to the shear droop portion.

As a result of investigation, when the thickness was more than 30 μm, a shear droop was greatly reduced (the width of the shear droop to the thickness was 30% or less), and the punchability could be improved. The details will be described in the following embodiment.

Punched amorphous metal thin strips can be disposed one on another in layers to obtain a laminated core for use in motors and the like. In order for the laminated core to be integrated without separation, the layers of amorphous metal thin strips are bonded together with a resin, or known means such as resin coating, resin impregnation, or caulking are used after the amorphous metal strips are disposed one on another in layers.

EXAMPLES

Example 1

By roll cooling, an amorphous metal thin ribbon having an alloy composition of $Fe_{81.5}Si_4B_{14.5}$ in atomic % was produced. Amorphous metal thin ribbons with a thickness ranging from 22.7 μm to 35.8 μm were prepared, as shown in Table 1. The thickness of a thin ribbon was calculated from the density, the weight and the dimensions (length× width). The width of the thin ribbon was 80 mm.

As a punching die, a cemented carbide material (FUJIL-LOY VF-12 material manufactured by FUJI DIE Co., Ltd.) was used for both the punch and the die. The punch is a rectangular column shape with a rectangular tip, and the dimensions are 5×15 mm with an R portion of 0.3 mm. The die has a machining hole into which the punch is inserted.

A single amorphous metal thin ribbon of each thickness was placed on a die and operated under the condition of 1,400 N of applied force to perform a punching process. Then, amorphous metal thin strips of 5×15 mm in different thicknesses were produced. The width of a shear droop on the punched surface of the amorphous metal thin strip of each thickness obtained by the punching process was measured. The width of a shear droop is the width in the thickness direction of a thin strip, and is the average value of five measurements taken at arbitrary locations on the punched surface. This arbitrary location on the punched surface can be selected from any punched surface of the amorphous metal thin strip. The results are described in Table 1.

FIG. 1 is a graph illustrating a relationship between the thickness of an amorphous metal thin strip and the width of a shear droop. The abscissa is the thickness of the amorphous metal thin strip, and the ordinate is the width of the shear droop.

In the sample No. 1 shown in Table 1, the end face of the thin strip protruded in the thickness direction in such a manner that the thin strip continuously bent beyond the thickness of the thin strip, and therefore the width of a shear droop was defined as the width from the position where the shear droop started to the portion where the shear droop protruded.

As shown in Table 1, the amorphous metal thin ribbon with a thickness of less than 30 μm had a width of a shear droop of more than 30% to the thickness of the thin ribbon. The width of the shear droop is 10 μm or more. In contrast, for an amorphous metal thin ribbon with a thickness of more than 30 μm, the width of a shear droop is 30% or less to the thickness of the thin ribbon, and the width of the shear droop is 5 μm or less. In other words, in a punching process, the life of a die can be improved by increasing the thickness of an amorphous metal thin ribbon used to more than 30 μm.

TABLE 1

| No. | thickness of thin ribbon t (μm) | width of shear droop a (μm) | a/t (%) |
|---|---|---|---|
| 1* | 22.7 | 34 | 150.7 |
| 2* | 23.6 | 22 | 94.1 |
| 3* | 30.0 | 11 | 36.5 |
| 4 | 30.4 | 4 | 14.1 |
| 5 | 33.3 | 4 | 12.3 |
| 6 | 35.8 | 4 | 11.2 |

(No. with * is Comparative Example.)

On the other hand, an amorphous metal thin ribbon with a thickness of more than 50 μm was not applicable for motor cores due to poor cooling inside the ribbon, crystallization inside the thin ribbon, and degradation of soft magnetic properties as an amorphous metal thin ribbon.

Because the entire ribbon was embrittled, chipping and cracking occurred even when punching was performed, and core materials of a desired shape could not be obtained in the first place. An amorphous metal thin ribbon is continuously cast in rolls and then wound once for transport, but an amorphous metal thin ribbon with a thickness of more than 50 μm is expected to break during winding and unwinding, making it difficult to apply to mass production.

Example 2

Amorphous metal thin ribbons of the alloy compositions and thicknesses shown in Table 2 were produced by roll cooling. The amorphous metal thin ribbons were punched in the same manner as in Example 1 to produce respective amorphous metal thin strips.

The width of a shear droop was particularly small for alloy compositions with addition of Al, Sn, or Ni.

In Fe-based amorphous alloys, it is confirmed that Al and other elements (Al, Sn, Ni, Cu, Cr, Mn) tend to segregate on the surface oxide film. When Al is segregated on the surface, so-called surface crystallization tends to occur, in which crystal grains grow in a dendritic manner starting from aggregated Al clusters. When heat-treated in a magnetic field for the purpose of imparting induced magnetic anisotropy, the surface-crystallized ribbon does not impart induced magnetic anisotropy efficiently, and the magnetic coercive force Hc tends to increase. An increase in the magnetic coercive force Hc directly leads to an increase in the loss in low frequency applications, such as power distribution transformer applications. Therefore, in the past, efforts have been made to keep the concentration of elements that accelerate surface crystallization, such as Al, as low as possible in the refining stage before casting. However, in mid- to high-frequency applications, especially in motor cores, where anisotropic high permeability is not necessarily needed, it is not necessary to pursue suppression of surface crystallization, and therefore Al or the like can be effectively contained.

Since the surface of a sample that has undergone surface crystallization is close to the surface state of bcc-Fe, the hardness is lower than that of the amorphous state, and deformation is initiated even with a weak load, thus greatly reducing occurrence of shear droop. A similar effect has been confirmed with substitution of Sn, and it is effective to substitute more elements than the impurity level (0.03%) that can suppress the surface tension (weaken the surface) to make the surface easier to crack.

Although the mechanism is unknown, the width of a shear droop was reduced even for the alloy composition with Ni added.

In Examples of the disclosure, the width of a shear droop was successfully reduced to 8 μm or less, further to 7 μm or less, further to 6 μm or less, and further to less than 6 μm.

TABLE 2

| No. | Alloy composition (atomic %) | Thickness of thin ribbon t (μm) | Width of shear droop a (μm) | Magnetic coercive force Hc (A/m) | a/t (%) |
|---|---|---|---|---|---|
| 11 | $Fe_{bal.}Si_4B_{14.5}$ | 36.1 | 6 | 3.9 | 16.6 |
| 12 | $Fe_{bal.}Si_9B_{11}$ | 34.3 | 6 | 4.8 | 14.7 |
| 13 | $Fe_{bal.}Si_4B_{14.5}Al_{0.2}$ | 36.4 | 5 | 8.7 | 13.8 |
| 14 | $Fe_{bal.}Si_4B_{14.5}Sn_{0.3}$ | 33.1 | 5 | 5.7 | 15.2 |
| 15 | $Fe_{bal.}Si_4B_{14.5}Al_{0.1}$ | 31.0 | 6 | 7.6 | 19.4 |
| 16 | $Fe_{bal.}Si_4B_{14.5}Cr_1$ | 39.2 | 6 | 2.4 | 15.0 |
| 17 | $Fe_{bal.}Si_4B_{14.5}Mn_1$ | 33.3 | 6 | 3.1 | 18.2 |
| 18 | $Fe_{bal.}Si_4B_{14.5}Ni_1$ | 30.3 | 5 | 3.3 | 16.7 |
| 19 | $Fe_{bal.}Si_4B_{14.5}Cu_{0.3}$ | 32.2 | 6 | 2.4 | 18.8 |
| 20 | $Fe_{bal.}Si_4B_{14.5}Cr_{0.5}Mn_{0.5}$ | 30.7 | 6 | 3.0 | 19.4 |
| 21 | $Fe_{bal.}Si_4B_{14.5}Cr_{0.5}Ni_{0.5}$ | 30.3 | 6 | 3.4 | 20.0 |
| 22 | $Fe_{bal.}Si_4B_{14.5}Mn_{0.5}Ni_{0.7}Cu_{0.3}$ | 30.8 | 6 | 4.3 | 19.4 |
| 23 | $Fe_{bal.}Si_4B_{14.5}Sn_{0.1}$ | 30.4 | 6 | 4.6 | 20.0 |
| 24* | $Fe_{bal.}Si_4B_{14.5}Al_{0.2}$ | 25.2 | 12 | 4.5 | 48.0 |
| 25* | $Fe_{bal.}Si_4B_{14.5}Sn_{0.2}$ | 22.7 | 12 | 5.7 | 52.2 |
| 26* | $Fe_{bal.}Si_4B_{14.5}$ | 22.4 | 13 | 6.9 | 56.5 |
| 27* | $Fe_{bal.}Si_4B_{14.5}$ | 26.0 | 12 | 3.9 | 46.2 |
| 28* | $Fe_{bal.}Si_4B_{14.5}$ | 28.7 | 10 | 3.8 | 34.5 |

(No. with * is Comparative Example.)

DESCRIPTION OF SYMBOLS

1: Amorphous metal thin ribbon
2: Punch
3: Die

The invention claimed is:

1. An amorphous metal thin strip, having an alloy composition represented by the following formula:

$$Fe_{100-a-b-c-d}B_aSi_bC_cM_d$$

wherein, in the formula, M is at least one of Al, Sn, Cr, Mn, Ni or Cu, and a, b, c, and d satisfy $7 \le a \le 20$, $1 \le b \le 19$, $0 \le c \le 4$, and $0 \le d \le 2$ in atomic %,
comprising:
a side configured by a punched surface on which at least a shear droop, a shearing surface, and a fractured surface are observed, wherein:
the metal thin strip has a thickness of 30.3 μm or larger and 50 μm or smaller, and
at the side, a width of the shear droop relative to the thickness of the metal thin strip is 30% or less.

2. The amorphous metal thin strip according to claim 1, wherein the width of the shear droop is 8 μm or less.

3. The amorphous metal thin strip according to claim 1, satisfying the relationship: $0.03 \le d \le 2$.

4. A laminated core in which a plurality of the amorphous metal thin strips according to claim 1 are disposed one on another in layers.

5. The laminated core according to claim 4, satisfying the relationship: $0.03 \le d \le 2$.

6. An amorphous metal thin ribbon punching method, comprising:
preparing an amorphous metal thin ribbon with a thickness of 30.3 μm or larger and 50 μm or smaller;
punching the amorphous metal thin ribbon; and forming a side of the amorphous metal thin ribbon configured by a punched surface on which at least a shear droop, a shearing surface, and a fractured surface are observed, wherein, at the side, a width of the shear droop relative to the thickness of the metal thin strip is 30% or less, wherein the amorphous metal thin ribbon has an alloy composition represented by the following formula:

$$Fe_{100-a-b-c-d}B_a Si_b C_c M_d$$

wherein, in the formula, M is at least one of Al, Sn, Cr, Mn, Ni or Cu, and a, b, c, and d satisfy $7 \leq a \leq 20$, $1 \leq b \leq 19$, $0 \leq c \leq 4$, and $0 \leq d \leq 2$ in atomic %.

7. The amorphous metal thin ribbon punching method according to claim 6, wherein, in the formula, $0.03 \leq d \leq 2$.

8. The amorphous metal thin ribbon punching method according to claim 6, further comprising using a punching die configured by a punch and a die.

9. The amorphous metal thin ribbon punching method according to claim 8, satisfying the relationship: $0.03 \leq d \leq 2$.

* * * * *